United States Patent
Hayashi

(10) Patent No.: US 11,528,375 B2
(45) Date of Patent: Dec. 13, 2022

(54) IMAGE READING DEVICE

(71) Applicant: KYOCERA Document Solutions Inc., Osaka (JP)

(72) Inventor: Hironori Hayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/654,548

(22) Filed: Mar. 11, 2022

(65) Prior Publication Data

US 2022/0303413 A1    Sep. 22, 2022

(30) Foreign Application Priority Data

Mar. 17, 2021    (JP) ............................. JP2021-044026

(51) Int. Cl.
    *H04N 1/40*       (2006.01)
    *H04N 1/00*       (2006.01)

(52) U.S. Cl.
    CPC ..... *H04N 1/00604* (2013.01); *H04N 1/00663* (2013.01); *H04N 1/00713* (2013.01); *H04N 1/00774* (2013.01)

(58) Field of Classification Search
    CPC ........... H04N 1/00604; H04N 1/00663; H04N 1/00713; H04N 1/00774
    See application file for complete search history.

(56) References Cited

U.S. PATENT DOCUMENTS

2003/0006544 A1*    1/2003    Lino .................. H04N 1/00578
                                                     271/3.14

FOREIGN PATENT DOCUMENTS

JP         2007049300 A      2/2007

* cited by examiner

*Primary Examiner* — Moustapha Diaby
(74) *Attorney, Agent, or Firm* — Alleman Hall Creasman & Tuttle LLP

(57) ABSTRACT

A document sheet length detection portion detects document sheets placed on a tray while distinguishing between a first size document sheet whose length in a conveyance direction is equal to or longer than a reference length, and a second size document sheet whose length in the conveyance direction is shorter than the reference length. A selection portion selects, as a specified conveyance process, one of a first conveyance process and a second conveyance process. A control portion, after a predetermined start event occurs, causes a conveyance device to execute the second conveyance process when the second conveyance process has been selected as the specified conveyance process and the document sheet length detection portion has detected the first size document sheet, and causes the conveyance device to execute the first conveyance process when a number of document sheets conveyed during the second conveyance process has reached an upper-limit number.

5 Claims, 6 Drawing Sheets

IMAGE READING DEVICE

INCORPORATION BY REFERENCE

This application is based upon and claims the benefit of priority from the corresponding Japanese Patent Application No. 2021-044026 filed on Mar. 17, 2021, the entire contents of which are incorporated herein by reference.

BACKGROUND

The present disclosure relates to an image reading device configured to convey a document sheet along one of two conveyance paths.

An image reading device may include a conveyance device and an image reading portion, wherein the conveyance device conveys a document sheet, and the image reading portion reads an image from the conveyed document sheet. Furthermore, the conveyance device may convey the document sheet along one of a turning conveyance path and a straight conveyance path.

In addition, a document sheet that is short in a conveyance direction may not be suitable for being conveyed along the turning conveyance path. On the other hand, such a short document sheet may be conveyed along the straight conveyance path.

For example, there is known a configuration of the image reading device in which a conveyance route of the document sheet is selected based on a detection result of a sensor disposed at a conveyance path. The sensor may be, for example, a thickness sensor that detects the thickness of the document sheet, or a document sheet detecting sensor that detects a passing time of the document sheet.

SUMMARY

An image reading device according to an aspect of the present disclosure includes a first tray, a second tray, and a third tray respectively configured such that document sheets are stacked thereon, a document sheet length detection portion, a conveyance device, an image reading portion, a selection portion, and a control portion. The document sheet length detection portion detects the document sheets placed on the first tray while distinguishing between a first size document sheet and a second size document sheet, the first size document sheet being a document sheet whose length in a conveyance direction is equal to or longer than a predetermined reference length, the second size document sheet being a document sheet whose length in the conveyance direction is shorter than the reference length. The conveyance device selectively executes a first conveyance process and a second conveyance process, wherein in the first conveyance process, the conveyance device conveys the document sheets on the first tray one by one along a first conveyance path that corresponds to conveyance of the second size document sheet, and discharges the second size document sheet onto the second tray, and in the second conveyance process, the conveyance device conveys the document sheets on the first tray one by one along a second conveyance path that corresponds to conveyance of the first size document sheet and the second size document sheet, and discharges the document sheets onto the third tray. The image reading portion reads an image from a document sheet conveyed during the first conveyance process or the second conveyance process. The selection portion selects, as a specified conveyance process, one of the first conveyance process and the second conveyance process in accordance with a predetermined selection operation. The control portion, after a predetermined start event occurs, causes the conveyance device to execute the second conveyance process when the second conveyance process has been selected as the specified conveyance process and the document sheet length detection portion has detected the first size document sheet, and causes the conveyance device to execute the first conveyance process when a number of document sheets conveyed during the second conveyance process has reached a predetermined upper-limit number.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Reading Device 1]

An image reading device 1 according to an embodiment is configured to convey a document sheet 9 and read an image from the conveyed document sheet 9.

Figure 1:
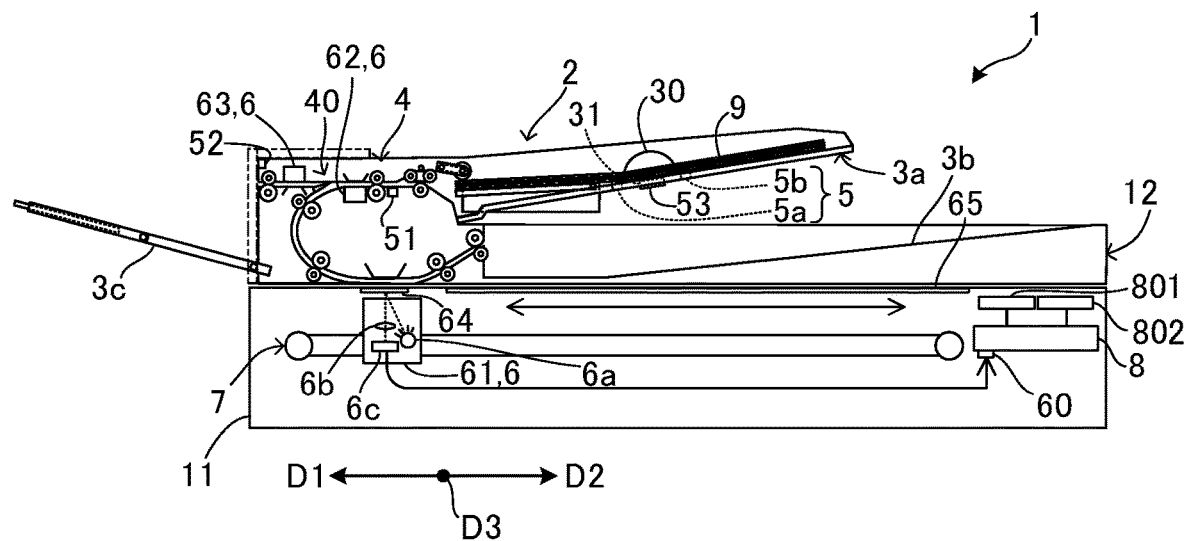
FIG. 1 is a configuration diagram of an image reading device according to an embodiment.

As shown in FIG. 1, the image reading device 1 includes a main body portion 11 and a cover portion 12 that covers an upper surface of the main body portion 11. The main body portion 11 is a housing storing a variety of devices. The cover portion 12 is supported in such a way as to be displaced between a position at which to cover the upper surface of the main body portion 11 and a position at which to open the upper surface of the main body portion 11. The cover portion 12 is displaceably supported by a hinge (not shown) provided at the main body portion 11.

Furthermore, the image reading device 1 includes a contact glass 64 and a platen glass 65 that are disposed at the upper surface of the main body portion 11. The contact glass 64 and the platen glass 65 are both transparent, plate-like members.

Furthermore, the image reading device 1 includes a document sheet conveying device 2, an image reading portion 6, a moving mechanism 7, a control device 8, an operation device 801, and a display device 802. The document sheet conveying device 2 is built in the cover portion 12.

The document sheet conveying device 2 includes a supply tray 3a, a first discharge tray 3b, a conveyance path 40, a conveyance device 4, a supply document sheet detection portion 5, a conveyed document sheet sensor 51, and a tray closure sensor 52. The conveyance path 40 forms a passage along which the document sheet 9 is conveyed.

The supply tray 3a and the first discharge tray 3b are respectively configured such that document sheets 9 are stacked thereon. In the present embodiment, the first discharge tray 3b is located below the supply tray 3a. It is noted that the supply tray 3a is an example of a first tray, and the first discharge tray 3b is an example of a second tray.

The supply document sheet detection portion 5 is configured to detect a document sheet 9 placed on the supply tray 3a. The supply document sheet detection portion 5 includes a first supply document sheet sensor 5a and a second supply document sheet sensor 5b. The first supply document sheet sensor 5a and the second supply document sheet sensor 5b are each configured to detect the document sheet 9 placed on the supply tray 3a.

For example, each of the first supply document sheet sensor 5a and the second supply document sheet sensor 5b includes a first displacement member (not shown) and a first detection sensor (not shown).

Upon receiving the load of the document sheets 9 on the supply tray 3a, the first displacement member is displaced from an upper position, an initial position, to a lower position that is located lower than the upper position. The first detection sensor detects the first displacement member displaced to the lower position.

The conveyed document sheet sensor 51 is configured to detect a document sheet 9 that has been fed from the supply tray 3a to the conveyance path 40. For example, the conveyed document sheet sensor 51 includes a second displacement member (not shown) and a second detection sensor (not shown).

Upon contacting the document sheet 9 fed from the supply tray 3a to the conveyance path 40, the second displacement member is displaced from a reference position to a retracted position. The second detection sensor detects the second displacement member displaced to the retracted position.

The conveyance device 4 feeds the document sheets 9 on the supply tray 3a one by one to the conveyance path 40, conveys the document sheet 9 along the conveyance path 40, and discharges the document sheet 9 onto the first discharge tray 3b.

In the following description, a horizontal direction in which the document sheet 9 is fed from the supply tray 3a, is referred to as a first direction D1, and a direction opposite to the first direction D1 is referred to as a second direction D2. In addition, a horizontal direction that is perpendicular to the first direction D1 and the second direction D2 is referred to as a third direction D3.

Figure 2:
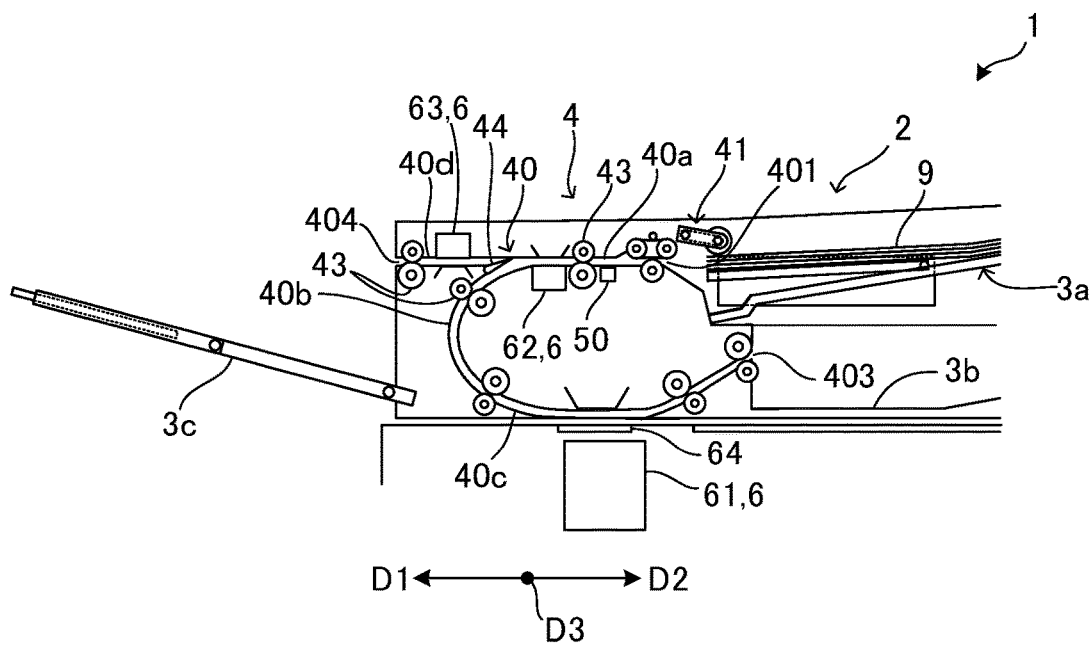
FIG. 2 is a configuration diagram of a document sheet conveyance device in the image reading device according to the embodiment.

As shown in FIG. 2, the conveyance path 40 includes a feed-in path 40a, a turning path 40b, and a first feed-out path 40c. The feed-in path 40a extends, in the first direction D1, from a feed-in port 401 corresponding to the supply tray 3a. The conveyed document sheet sensor 51 detects the document sheet 9 fed to the feed-in path 40a.

The turning path 40b is a curved path continuing from the feed-in path 40a where the conveyance direction of the document sheet 9 changes from the first direction D1 to the second direction D2. The first feed-out path 40c continues from the turning path 40b and extends in the second direction D2 to a first discharge port 403 corresponding to the first discharge tray 3b. The first feed-out path 40c passes a position along an upper surface of the contact glass 64 and reaches the first discharge port 403.

The conveyance device 4 includes a feed-out mechanism 41 and a plurality of pairs of conveyance rollers 43, wherein the feed-out mechanism 41 corresponds to the supply tray 3a, and the plurality of pairs of conveyance rollers 43 are disposed along the conveyance path 40.

The feed-out mechanism 41 feeds the document sheets 9 on the supply tray 3a one by one to the feed-in path 40a. In the present embodiment, the feed-out mechanism 41 feeds a top one of the document sheets 9 on the supply tray 3a to the feed-in path 40a.

The plurality of pairs of conveyance rollers 43 convey the document sheet 9 along the conveyance path 40 by being rotationally driven by a motor (not shown).

The image reading portion 6 executes an image reading process to read an image from a document sheet 9 and output data of the read image. The image reading portion 6 is configured to execute the image reading process on the document sheet 9 that is conveyed along the conveyance path 40. Furthermore, the image reading portion 6 is configured to execute the image reading process on the document sheet 9 placed on the platen glass 65. In the following description, the image read from the document sheet 9 by the image reading portion 6 is referred to as a read image.

In the present embodiment, the image reading portion 6 includes a first image reading portion 61, a second image reading portion 62, and an AFE (Analog Front End) 60.

In the following description, an upper surface of a document sheet 9 placed on the supply tray 3a is referred to as a first surface, and a lower surface of the document sheet 9 placed on the supply tray 3a is referred to as a second surface.

The first image reading portion 61, in a state of being disposed at a position corresponding to the contact glass 64, reads an image from the first surface of the document sheet 9 when the document sheet 9 passes through the first feed-out path 40c. The second image reading portion 62 reads an image from the second surface of the document sheet 9 when the document sheet 9 passes through the feed-in path 40a.

In the present embodiment, each of the first image reading portion 61 and the second image reading portion 62 includes a light emitting portion 6a, a lens 6b, and an image sensor 6c (see FIG. 1). The light emitting portion 6a, the lens 6b, and the image sensor 6c are respectively formed to extend along the third direction D3.

The light emitting portion 6a irradiates light to the document sheet 9. The lens 6b guides light reflected from the document sheet 9 to the image sensor 6c. The image sensor 6c is a line sensor that detects an intensity of the light reflected from the document sheet 9, and outputs a detection signal as a signal of the read image.

The AFE 60 converts the signal of the read image to digital image data, and outputs the digital image data. The digital image data is data of the read image.

In the example shown in FIG. 1, each of the first image reading portion 61 and the second image reading portion 62 is a CIS (Contact Image Sensor) in which the light emitting portion 6a, the lens 6b, and the image sensor 6c of a CMOS (Complementary Metal Oxide Semiconductor) type are integrated.

The moving mechanism 7 moves the first image reading portion 61 within a range that extends from a position facing the contact glass 64 to a position facing the platen glass 65.

When the document sheet 9 is conveyed by the conveyance device 4, the moving mechanism 7 holds the first image reading portion 61 at the position facing the contact glass 64.

On the other hand, in a case where the document sheet 9 is placed on the platen glass 65, the moving mechanism 7 moves the first image reading portion 61 along the platen glass 65. This allows the image sensor 6c of the first image reading portion 61 to read an image from the document sheet 9 while light emitted from the light emitting portion 6a of the first image reading portion 61 is scanned over the document sheet 9 on the platen glass 65.

That is, when the conveyance device 4 operates, the image reading portion 6 executes the image reading process on the document sheet 9 conveyed along the conveyance path 40. On the other hand, when the conveyance device 4 does not operate, the image reading portion 6 executes the image reading process on the document sheet 9 placed on the platen glass 65.

It is noted that the image sensor 6c of the first image reading portion 61 may be a sensor of a CCD (Charge Coupled Device) type. In this case, the moving mechanism 7 moves the light emitting portion 6a and the lens 6b, and the CCD-type image sensor 6c is fixed at a predetermined position.

The operation portion 801 is a device configured to receive user operations, and, for example, includes an operation button and a touch panel. The display portion 802 is a device configured to display information, and, for example, includes a panel display device such as a liquid crystal display unit.

Figure 3:
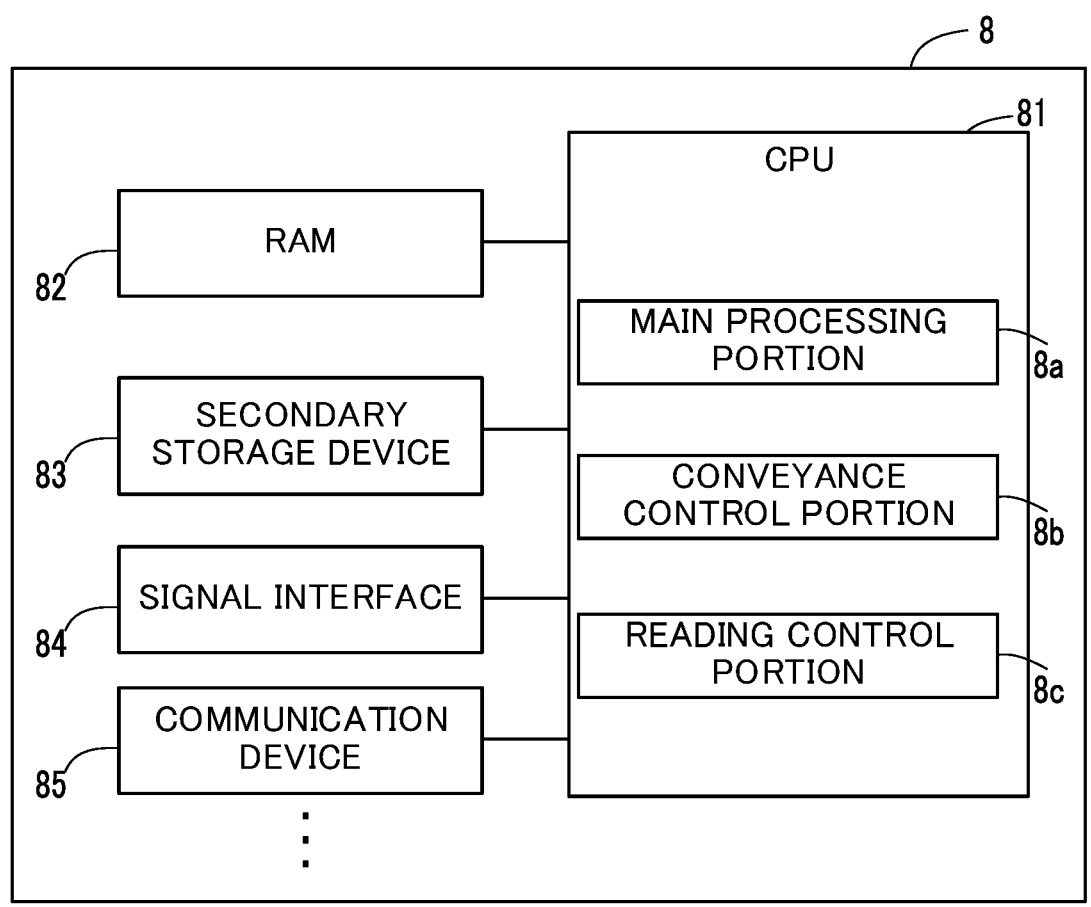
FIG. 3 is a block diagram showing a configuration of a control device in the image reading device according to the embodiment.

The control device 8 is configured to execute various types of data processing and control the image reading device 1. As shown in FIG. 3, the control device 8 includes a CPU (Central Processing Unit) 81 and peripheral devices such as a RAM (Random Access Memory) 82, a secondary storage device 83, and a signal interface 84. Furthermore, the control device 8 includes a communication device 85 configured to perform communication with other devices.

The secondary storage device 83 is a computer-readable nonvolatile storage device. The secondary storage device 83 is configured to store and update the computer programs and various types of data. For example, either or both of a flash memory and a hard disk drive are adopted as the secondary storage device 83.

The signal interface 84 is configured to convert signals output from the various sensors to digital data, and transmit the digital data to the CPU 81. Furthermore, the signal interface 84 is configured to convert a control command output from the CPU 81 to a control signal and transmit the control signal to a control-target device.

The CPU 81 is a processor that executes various types of data processing and controls by executing computer programs. The RAM 82 is a computer-readable volatile storage device. The RAM 82 primarily stores the computer programs that are executed by the CPU 81, and data that is output and consulted by the CPU 81 during execution of the various types of processing.

The CPU 81 includes a plurality of processing modules that are realized when the computer programs are executed. The plurality of processing modules include a main processing portion 8a, a conveyance control portion 8b, and a reading control portion 8c.

The main processing portion 8a performs a control to start any one of the various types of processing in accordance with an operation performed on the operation device 801, and performs a control of the display device 802.

The conveyance control portion 8b controls conveyance of the document sheet 9 by controlling the conveyance device 4. The reading control portion 8c causes the image reading portion 6 to execute the image reading process by controlling the image reading portion 6.

In the present embodiment, the document sheet conveying device 2 further includes a second discharge tray 3c that is configured such that document sheets 9 are stacked thereon (see FIG. 1, FIG. 2). The second discharge tray 3c is an example of a third tray. The conveyance device 4 is configured to selectively execute a turning conveyance process and a straight conveyance process.

In the turning conveyance process, a document sheet 9 on the supply tray 3a is conveyed via the turning path 40b, and discharged onto the first discharge tray 3b. In the straight conveyance process, a document sheet 9 on the supply tray 3a is conveyed along a conveyance path that branches in front of the turning path 40b, and discharged onto the second discharge tray 3c that is different from the first discharge tray 3b.

As shown in FIG. 1 and FIG. 2, the second discharge tray 3c is disposed at a position that is separated from the supply tray 3a and the first discharge tray 3b in the first direction D1. The second discharge tray 3c is configured to be folded along an outer edge of the cover portion 12.

In addition, the conveyance path 40 further includes a second feed-out path 40d. The second feed-out path 40d continues from the feed-in path 40a and extends in the first direction D1 to a second discharge port 404 that corresponds to the second discharge tray 3c.

That is, the conveyance path 40 branches from the feed-in path 40a to the turning path 40b and the second feed-out path 40d.

In the following description, a path extending from the feed-in path 40a to the first feed-out path 40c via the turning path 40b in the conveyance path 40 is referred to as a first conveyance path 40a-40c. In addition, a path extending from the feed-in path 40a to the second feed-out path 40d in the conveyance path 40 is referred to as a second conveyance path 40a-40d.

Furthermore, the conveyance device 4 includes a route switching mechanism 44. In addition, the image reading device 1 further includes a third image reading portion 63 that constitutes a part of the image reading portion 6.

The route switching mechanism 44 guides the document sheet 9 conveyed along the feed-in path 40a to one of the turning path 40b and the second feed-out path 40d selectively. In other words, the route switching mechanism 44 selectively guides the document sheet 9 along either the first conveyance path 40a-40c or the second conveyance path 40a-40d.

The conveyance device 4 is configured to perform a first operation in which the route switching mechanism 44 guides the document sheet 9 to the turning path 40b while the feed-out mechanism 41 and the plurality of pairs of conveyance rollers 43 operate.

Furthermore, the conveyance device 4 is configured to perform a second operation in which the route switching mechanism 44 guides the document sheet 9 to the second feed-out path 40d while the feed-out mechanism 41 and the plurality of pairs of conveyance rollers 43 operate.

The conveyance device 4 executes, by performing the first operation, a first conveyance process to convey document sheets 9 on the supply tray 3a one by one along the first conveyance path 40a-40c and discharge the document sheet 9 onto the first discharge tray 3b. The first conveyance process is the turning conveyance process.

In addition, the conveyance device 4 executes, by performing the second operation, a second conveyance process to convey document sheets 9 on the supply tray 3a one by one along the second conveyance path 40a-40d and discharge the document sheet 9 onto the second discharge tray 3c. The second conveyance process is the straight conveyance process.

The third image reading portion 63 reads an image from the first surface of the document sheet 9 that is passing the second feed-out path 40d. The third image reading portion 63 has the same configuration as the second image reading portion 62.

The second discharge tray 3c is supported in such a way as to be displaced between a closing position and an opening position, wherein at the closing position, the second discharge tray 3c closes the second discharge port 404, and at the opening position, the second discharge tray 3c opens the second discharge port 404. The second discharge port 404 is a discharge port of the second conveyance path 40a-40d. When the second discharge tray 3c is located at the opening position, the document sheets 9 can be stacked on the second discharge tray 3c.

The tray closure sensor 52 detects a tray closure state in which the second discharge tray 3c is located at the closing position. For example, the tray closure sensor 52 is a contact type limit sensor or a non-contact type photo sensor that is configured to detect the second discharge tray 3c at the closing position. The tray closure sensor 52 is an example of a tray closure detection portion.

The conveyance device 4 is configured to selectively execute the first conveyance process and the second conveyance process in accordance with a control performed by the conveyance control portion 8b.

As described above, the conveyance device 4 is configured to convey the document sheets 9 on the supply tray 3a one by one along the conveyance path 40, and discharge the document sheet 9 onto the first discharge tray 3b or the second discharge tray 3c from the conveyance path 40.

In the following description, the image reading process during which the conveyance device 4 operates, is referred to as a conveyance mode reading process.

During the conveyance mode reading process, the conveyance control portion 8b performs a control to cause the conveyance device 4 to execute, for each document sheet 9, either the first conveyance process or the second conveyance process.

The image reading portion 6 is configured to read an image from a document sheet 9 conveyed during the first conveyance process or the second conveyance process.

Meanwhile, the image reading device 1 may have a function to select a conveyance route of the document sheet 9 in accordance with a user operation. This function is, for example, effective in a case where it is difficult to automatically select a conveyance route of the document sheet 9 in accordance with a detection result of a sensor disposed at the conveyance path 40.

As described below, the main processing portion 8a is configured to execute a process to select a conveyance route of the document sheet 9 in accordance with a user operation performed on the operation device 801.

On the other hand, there may be a case where one of two discharge trays adopted in correspondence with two conveyance paths is a simple tray on which a small number of document sheets 9 can be stacked. In the present embodiment, the second discharge tray 3c is a simple tray on which a smaller number of document sheets 9 can be stacked than on the first discharge tray 3b.

When a discharge tray corresponding to a conveyance path selected by the user is the second discharge tray 3c, and a large number of document sheets 9 are stacked on the supply tray 3a, an excessive stack of the document sheets 9 on the second discharge tray 3c may occur.

The CPU 81 of the image reading device 1 executes a conveyance pre-process and a conveyance reading control that are described below. This allows the image reading device 1 to prevent an excessive stack of the document sheets 9 on the second discharge tray 3c when a conveyance route of the document sheet 9 is selected in accordance with a user operation.

In the present embodiment, the first conveyance path 40a-40c is not suitable for conveying a document sheet 9 whose length in the conveyance direction is shorter than a predetermined reference length. On the other hand, both a document sheet 9 whose length in the conveyance direction is shorter than the reference length and a document sheet 9 whose length in the conveyance direction is longer than the reference length can be conveyed along the second conveyance path 40a-40d.

In the following description, a document sheet 9 whose length in the conveyance direction is equal to or longer than the reference length is referred to as a first size document sheet, and a document sheet 9 whose length in the conveyance direction is shorter than the reference length is referred to as a second size document sheet. A paper jam is apt to occur when the second size document sheet is conveyed along the first conveyance path 40a-40c.

The first supply document sheet sensor 5a is disposed at a position where it can detect a document sheet 9 placed on the supply tray 3a regardless whether the document sheet 9 is the first size document sheet or the second size document sheet. On the other hand, the second supply document sheet sensor 5b is disposed at a position where it can detect the first size document sheet but cannot detect the second size document sheet on the supply tray 3a.

That is, when both the first supply document sheet sensor 5a and the second supply document sheet sensor 5b are detecting a document sheet 9, the supply document sheet detection portion 5 is in a state of detecting the first size document sheet placed on the supply tray 3a.

On the other hand, when the first supply document sheet sensor 5a is detecting a document sheet 9 and the second supply document sheet sensor 5b is not detecting a document sheet 9, the supply document sheet detection portion 5 is in a state of detecting the second size document sheet placed on the supply tray 3a.

That is, the supply document sheet detection portion 5 is configured to detect the document sheets 9 placed on the supply tray 3a while distinguishing between the first size document sheet and the second size document sheet. The supply document sheet detection portion 5 is an example of a document sheet length detection portion.

In addition, the document sheet conveying device 2 further includes a pair of side cursors 30, a cursor support mechanism 31, and a cursor position sensor 53 (see FIG. 1). The cursor position sensor 53 is an example of a cursor position detection portion.

The pair of side cursors 30 are provided at the supply tray 3a in such a way as to move along a width direction crossing the conveyance direction. The pair of side cursors 30 are operated by a person to be placed along opposite sides of document sheets 9 on the supply tray 3a. The width direction is the third direction D3.

The pair of side cursors 30, by being placed along opposite sides of the document sheets 9 on the supply tray 3a, guide a document sheet 9 along the conveyance direction when the document sheet 9 is fed from the supply tray 3a to the conveyance path 40.

The pair of side cursors 30 are supported by the cursor support mechanism 31 in such a way as to move along the width direction. For example, the cursor support mechanism 31 is a rack and pinion mechanism configured to move the pair of side cursors 30 in conjunction with each other to approach each other or to separate from each other along the width direction.

The rack and pinion mechanism includes a pair of rack gears and a pinion gear, wherein the pair of rack gears are respectively coupled with the pair of side cursors 30, and the pinion gear meshes with the pair of rack gears.

The cursor position sensor 53 detects a position of the pair of side cursors 30 in the width direction. For example, the cursor position sensor 53 is a potentiometer that measures a rotation amount of the pinion gear or a displacement amount of the rack gear in the rack and pinion mechanism.

Figure 4:
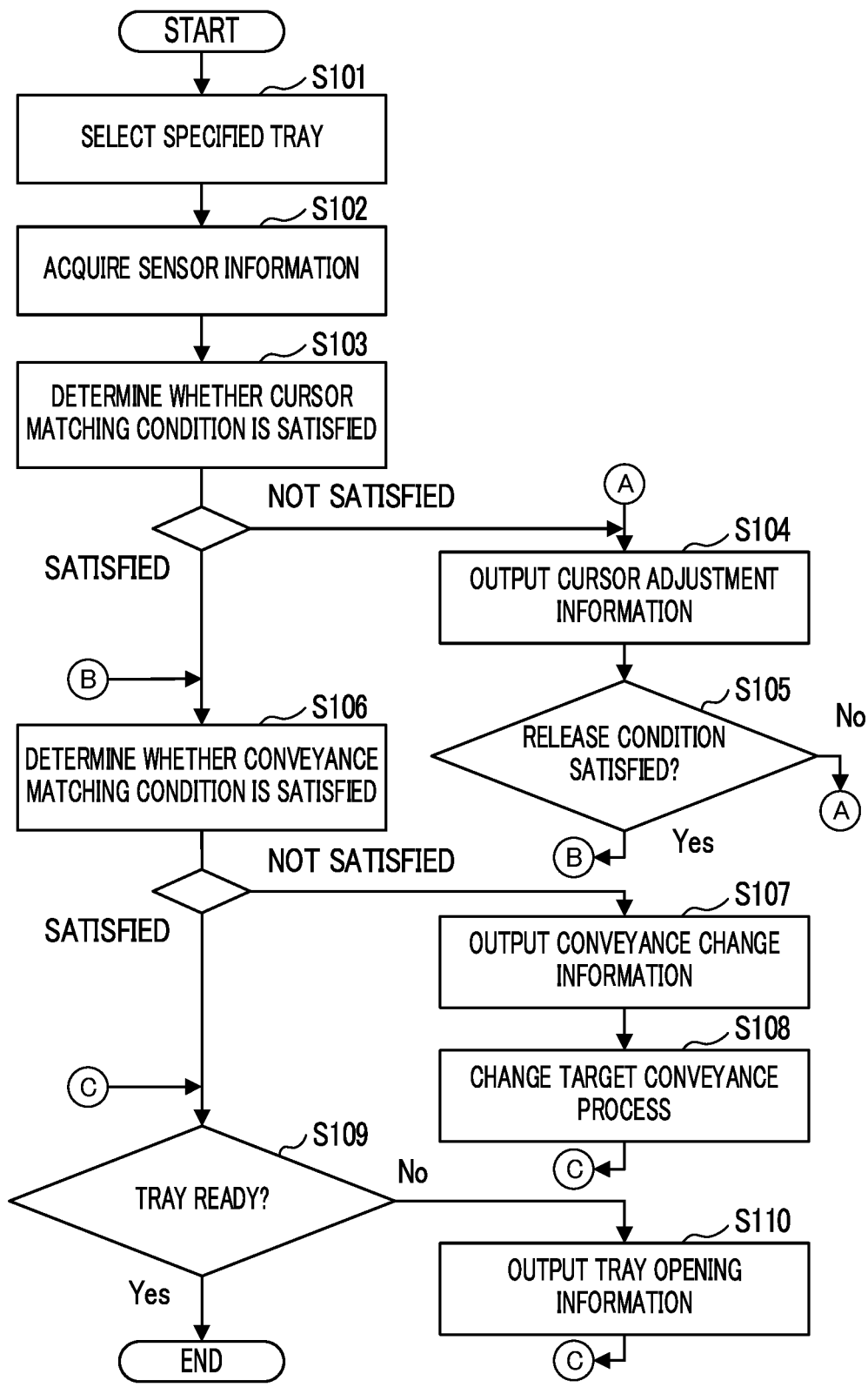
FIG. 4 is a flowchart showing an example of a procedure of a conveyance pre-process in the image reading device according to the embodiment.

The main processing portion 8a starts the conveyance pre-process upon occurrence of a predetermined start event (see FIG. 4). The conveyance control portion 8b prohibits the conveyance device 4 from operating until the conveyance pre-process is completed.

Figure 5:
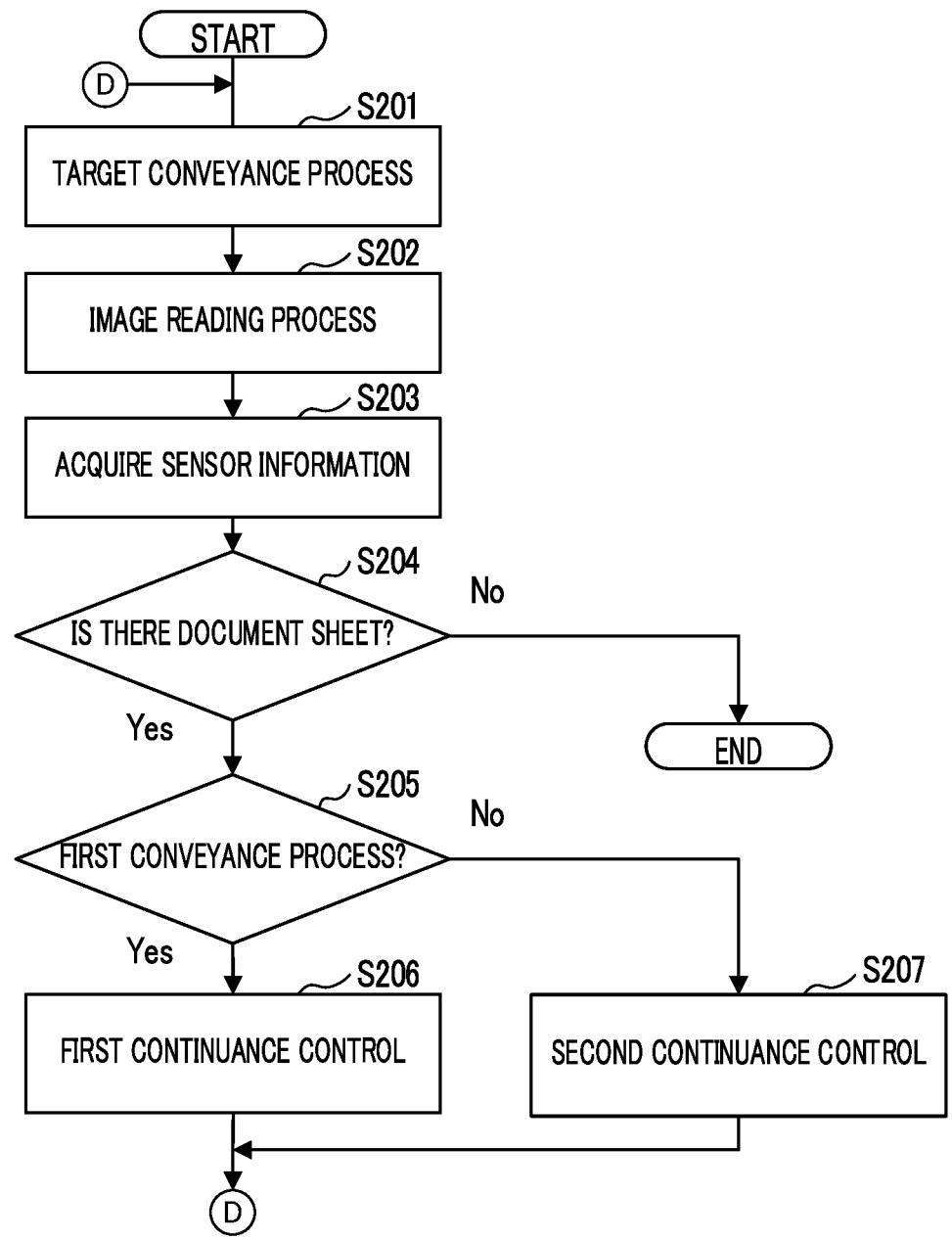
FIG. 5 is a flowchart showing an example of a procedure of a conveyance reading control in the image reading device according to the embodiment.

Furthermore, the conveyance control portion 8b starts the conveyance reading control following the end of the conveyance pre-process (see FIG. 5).

For example, the start event is that a predetermined start operation performed on the operation device 801 is detected in a state where a document sheet 9 on the supply tray 3a is detected by the supply document sheet detection portion 5.

[Conveyance Pre-Process]

The following describes an example of a procedure of the conveyance pre-process with reference to the flowchart shown in FIG. 4.

In the following description, S101, S102, . . . are identification signs representing a plurality of steps of the conveyance pre-process. In the conveyance pre-process, first, the process of step S101 is started.

<Step S101>

In step S101, the main processing portion 8a selects a specified tray in accordance with a predetermined selection operation performed on the operation device 801. For this, the main processing portion 8a displays a predetermined selection menu screen on the display device 802.

The specified tray is either the first discharge tray 3b or the second discharge tray 3c that is selected as a discharge destination of the document sheet 9. In the present embodiment, when the specified tray is selected, it means that one of the first conveyance process and the second conveyance process is selected as a specified conveyance process.

The main processing portion 8a executing the process of step S101 is an example of a selection portion that selects, as the specified conveyance process, one of the first conveyance process and the second conveyance process in accordance with a predetermined selection operation.

In step S101, the conveyance control portion 8b sets, as a target conveyance process, one of the first conveyance process and the second conveyance process that corresponds to the specified tray. The target conveyance process is executed by the conveyance device 4 under the control of the conveyance control portion 8b.

It is noted that in the present embodiment, the target conveyance process is changed according to the situation. The change of the target conveyance process is described below (see step S108).

Upon selection of the specified tray, the main processing portion 8a moves the process to step S102. It is noted that the process of step S101 may be executed before the start event occurs.

<Step S102>

In step S102, the conveyance control portion 8b acquires sensor information from the supply document sheet detection portion 5, the tray closure sensor 52, and the cursor position sensor 53, and moves the process to step S103.

The sensor information includes detection results of the supply document sheet detection portion 5, the tray closure sensor 52, and the cursor position sensor 53.

<Step S103>

In step S103, the conveyance control portion 8b determines whether or not a predetermined cursor matching condition is satisfied between a detection result of the supply document sheet detection portion 5 and a detection result of the cursor position sensor 53.

When the cursor matching condition is not satisfied, it means that there is a high possibility that the pair of side cursors 30 are not placed along opposite sides of the document sheets 9 on the supply tray 3a.

When the document sheet 9 is paper of a standard size, a correspondence relationship between a longitudinal size and a lateral size of the document sheet 9 is predetermined according to the size of the document sheet 9.

The cursor matching condition includes: a condition for a first allowance range corresponding to the first size document sheet; and a condition for a second allowance range corresponding to the second size document sheet. The first allowance range is an allowance range of a detection result of the cursor position sensor 53 corresponding to the first size document sheet. The second allowance range is an allowance range of a detection result of the cursor position sensor 53 corresponding to the second size document sheet.

The conveyance control portion 8b determines that the cursor matching condition is satisfied when the supply document sheet detection portion 5 detects the first size document sheet, and the detection result of the cursor position sensor 53 is within the first allowance range.

Furthermore, the conveyance control portion 8b determines that the cursor matching condition is satisfied when the supply document sheet detection portion 5 detects the second size document sheet, and the detection result of the cursor position sensor 53 is within the second allowance range.

In addition, as for the other cases, the conveyance control portion 8b determines that the cursor matching condition is not satisfied. Upon determining that the cursor matching condition is satisfied, the conveyance control portion 8b moves the process to step S106, and upon determining that the cursor matching condition is not satisfied, the conveyance control portion 8b moves the process to step S104.

<Step S104>

In step S104, the main processing portion 8a outputs, via the display device 802, cursor adjustment information that urges position adjustment of the pair of side cursors 30. Thereafter, the main processing portion 8*a* moves the process to step S105.

The display device 802 is an example of an information output device. In addition, the main processing portion 8*a* executing the process of step S104 is an example of a second notification portion.

It is noted that the main processing portion 8*a* may output, via the communication device 85, the cursor adjustment information to another device such as an information terminal of the user. The communication device 85 and the information terminal are each an example of the information output device, too.

<Step S105>

In step S105, the conveyance control portion 8*b* determines whether or not a predetermined release condition is satisfied. The release condition includes the cursor matching condition as a sufficient condition.

For example, the release condition is a logical sum of a release operation condition and the cursor matching condition, wherein the release operation condition is that a predetermined release operation is performed on the operation device 801.

Upon determining that the release condition is satisfied, the conveyance control portion 8*b* moves the process to step S106. In that case, the main processing portion 8*a* stops outputting the cursor adjustment information.

On the other hand, upon determining that the release condition is not satisfied, the conveyance control portion 8*b* moves the process to step S104. That is, the conveyance control portion 8*b* waits while executing the process of step S104 until it determines that the release condition is satisfied.

<Step S106>

In step S106, the conveyance control portion 8*b* determines whether or not a predetermined conveyance matching condition is satisfied.

The conveyance matching condition indicates that the specified conveyance process corresponding to the specified tray matches the length of the document sheet 9 detected by the supply document sheet detection portion 5.

That is, in a case where the specified conveyance process is the first conveyance process, the conveyance matching condition is satisfied when the supply document sheet detection portion 5 detects the first size document sheet. Otherwise, the conveyance matching condition is not satisfied.

Furthermore, in a case where the specified conveyance process is the second conveyance process, the conveyance matching condition is satisfied when the supply document sheet detection portion 5 detects the first size document sheet or the second size document sheet. Otherwise, the conveyance matching condition is not satisfied.

That is, it is determined that the conveyance matching condition is not satisfied only when the specified conveyance process is the first conveyance process and the supply document sheet detection portion 5 detects the second size document sheet.

Upon determining that the conveyance matching condition is satisfied, the conveyance control portion 8*b* moves the process to step S109, and upon determining that the conveyance matching condition is not satisfied, the conveyance control portion 8*b* moves the process to step S107.

<Step S107>

In step S107, the main processing portion 8*a* outputs, via the display device 802, conveyance change information that indicates that the document sheet 9 is conveyed to the second discharge tray 3*c*. Thereafter, the main processing portion 8*a* moves the process to step S108.

It can be said also that the conveyance change information indicates that the second conveyance process is executed. The main processing portion 8*a* executing the process of step S107 is an example of a first notification portion.

<Step S108>

In step S108, the conveyance control portion 8*b* changes the target conveyance process from the first conveyance process to the second conveyance process. Thereafter, the conveyance control portion 8*b* moves the process to step S109.

<Step S109>

In step S109, the conveyance control portion 8*b* determines whether or not the tray is ready. Upon determining that the tray is ready, the conveyance control portion 8*b* ends the conveyance pre-process, and upon determining that the tray is not ready, the conveyance control portion 8*b* moves the process to step S110.

Specifically, the conveyance control portion 8*b* determines that the tray is not ready when the target conveyance process has been set to the second conveyance process, and the tray closure sensor 52 detects the tray closure state. Otherwise, the conveyance control portion 8*b* determines that the tray is ready.

<Step S110>

In step S110, the main processing portion 8*a* outputs, via the display device 802, tray opening information that urges opening of the second discharge tray 3*c*. Thereafter, the main processing portion 8*a* ends the conveyance pre-process.

The process of step S110 is executed when, after the start event occurs, the tray closure sensor 52 has detected the tray closure state, and the supply document sheet detection portion 5 has detected the second size document sheet.

It is noted that the main processing portion 8*a* stops outputting the tray opening information when the conveyance control portion 8*b* determines that the tray is ready in step S109. The main processing portion 8*a* executing the processes of steps S109 and S110 is an example of the first notification portion.

[Conveyance Reading Control]

Next, the following describes an example of a procedure of the conveyance reading control with reference to the flowchart shown in FIG. 5. As described above, the conveyance reading control is executed following the conveyance pre-process.

In the following description, S201, S202, . . . are identification signs representing a plurality of steps of the conveyance reading control. In the conveyance reading control, first, the process of step S201 is executed.

<Step S201>

In step S201, the conveyance control portion 8*b* causes the conveyance device 4 to execute the target conveyance process. With the start of the target conveyance process, the conveyance control portion 8*b* moves the process to step S202.

The conveyance control portion 8*b* counts the number of second conveyance processing by counting up the number of conveyed document sheets 9 each time it causes the conveyance device 4 to execute the target conveyance process. The conveyance control portion 8*b* counts the number of second conveyance processing in response to a change in the detection result of the conveyed document sheet sensor 51.

The number of second conveyance processing is the number of document sheets 9 conveyed during the second conveyance process. In addition, the number of second conveyance processing is also the number of document sheets 9 stacked on the second discharge tray 3c.

<Step S202>

In step S202, the reading control portion 8c executes the image reading process on the document sheet 9 conveyed during the target conveyance process. With the start of the image reading process, the reading control portion 8c moves the process to step S203.

During the processes of step S201 and step S202, one document sheet 9 is conveyed, and the image reading process is executed on the one document sheet 9.

<Step S203>

In step S203, the conveyance control portion 8b acquires the sensor information from the supply document sheet detection portion 5, the tray closure sensor 52, and the cursor position sensor 53, and moves the process to step S204.

<Step S204>

In step S204, upon determining that the supply document sheet detection portion 5 has detected the document sheet 9 on the supply tray 3a, the conveyance control portion 8b moves the process to step S205. Otherwise, the conveyance control portion 8b ends the conveyance reading control.

<Step S205>

In step S205, upon determining that the target conveyance process executed in step S201 is the first conveyance process, the conveyance control portion 8b moves the process to step S206. Otherwise, upon determining that the target conveyance process executed in step S201 is the second conveyance process, the conveyance control portion 8b moves the process to step S207.

<Step S206>

In step S206, the conveyance control portion 8b executes a first continuance control that is described below. With the completion of the first continuance control, the conveyance control portion 8b moves the process to step S201.

<Step S207>

In step S207, the conveyance control portion 8b executes a second continuance control that is described below. With the completion of the second continuance control, the conveyance control portion 8b moves the process to step S201.

[First Continuance Control]

Figure 6:
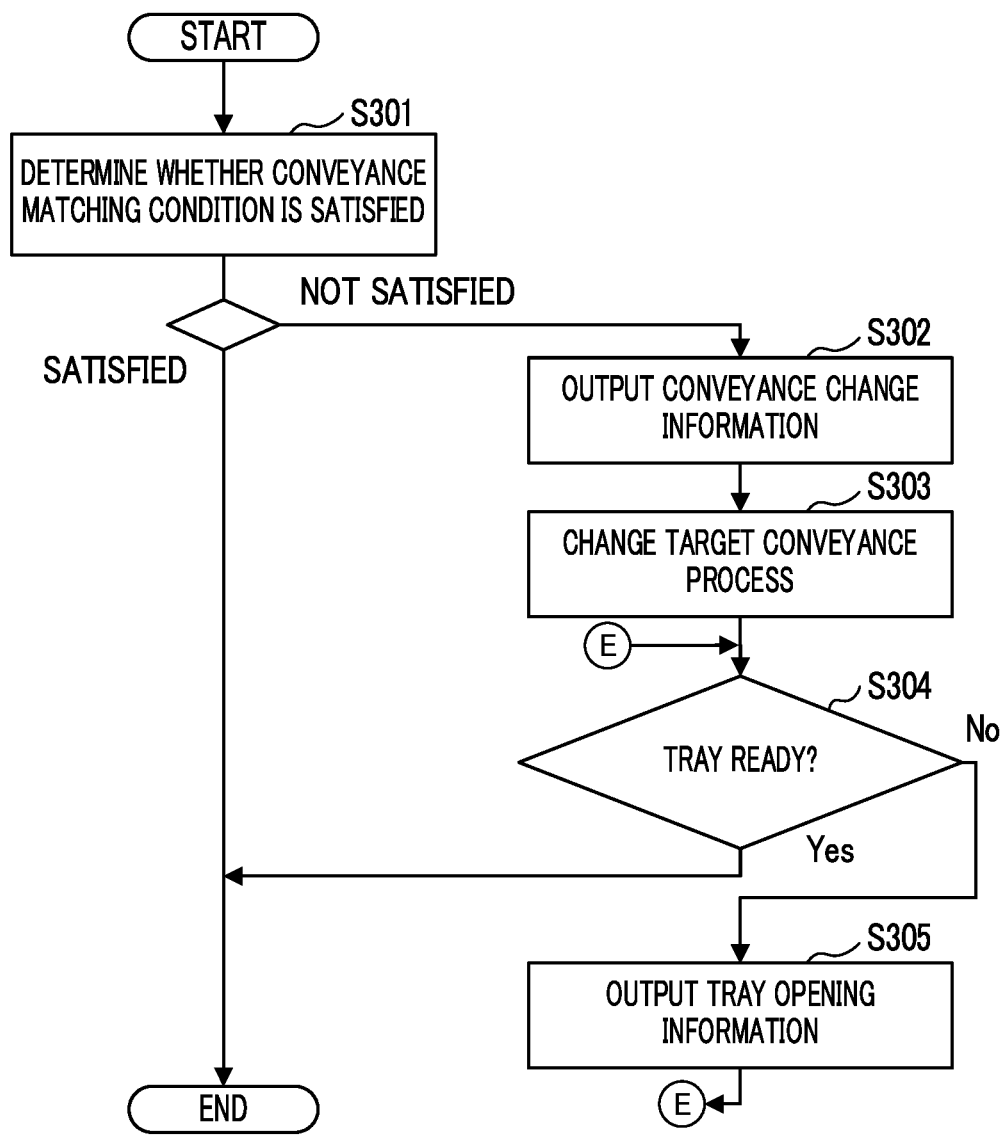
FIG. 6 is a flowchart showing an example of a procedure of a first continuance control in the image reading device according to the embodiment.

Next, the following describes an example of a procedure of the first continuance control with reference to the flowchart shown in FIG. 6.

In the following description, S301, S302, . . . are identification signs representing a plurality of steps of the first continuance control. In the first continuance control, first, the process of step S301 is executed.

<Step S301>

In step S301, as in step S106 of FIG. 4, the conveyance control portion 8b determines whether or not the conveyance matching condition is satisfied based on the sensor information acquired in step S203.

The determination result of step S301 may be different from that of step S106 when the first size document sheet is overlaid on the second size document sheet on the supply tray 3a.

Upon determining that the conveyance matching condition is satisfied, the conveyance control portion 8b ends the first continuance control, and upon determining that the conveyance matching condition is not satisfied, the conveyance control portion 8b moves the process to step S302.

<Step S302>

In step S302, as in step S107 of FIG. 4, the main processing portion 8a outputs the conveyance change information via the display device 802. Thereafter, the main processing portion 8a moves the process to step S303. The main processing portion 8a executing the process of step S302 is an example of the first notification portion, too.

<Step S303>

In step S303, as in step S108 of FIG. 4, the conveyance control portion 8b changes the target conveyance process from the first conveyance process to the second conveyance process. Thereafter, the conveyance control portion 8b moves the process to step S304.

<Step S304>

In step S304, as in step S109 of FIG. 4, the conveyance control portion 8b determines whether or not the tray is ready. Upon determining that the tray is ready, the conveyance control portion 8b ends the first continuance control, and upon determining that the tray is not ready, the conveyance control portion 8b moves the process to step S305.

<Step S305>

In step S305, as in step S110 of FIG. 4, the main processing portion 8a outputs the tray opening information via the display device 802. Thereafter, the main processing portion 8a ends the first continuance control.

It is noted that the main processing portion 8a stops outputting the tray opening information when the conveyance control portion 8b determines that the tray is ready in step S304. The main processing portion 8a executing the processes of step S304 and step S305 is an example of the first notification portion.

During the processes of step S303 to step S305, an image is read from a remaining second size document sheet on condition that the second discharge tray 3c is opened, and the second size document sheet is conveyed to the second discharge tray 3c by the second conveyance process.

[Second Continuance Control]

Figure 7:
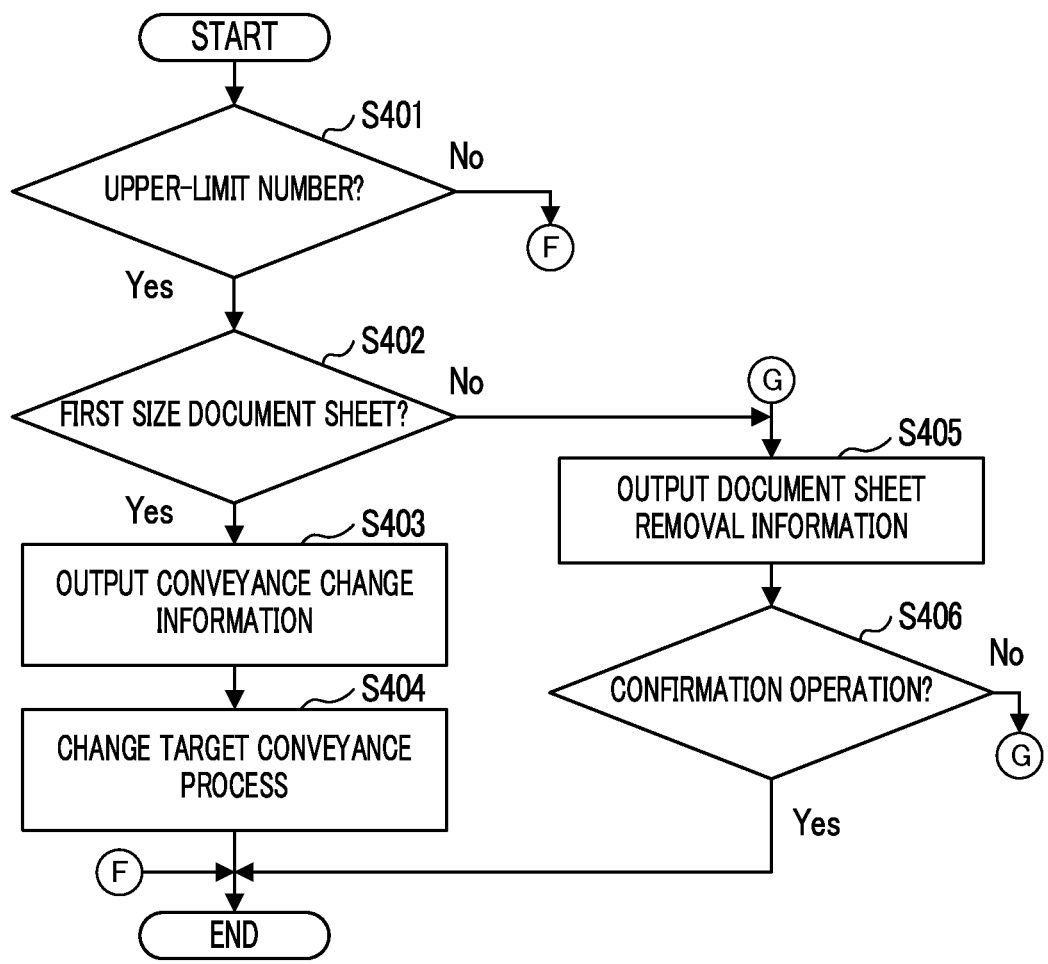
FIG. 7 is a flowchart showing an example of a procedure of a second continuance control in the image reading device according to the embodiment.

Next, the following describes an example of a procedure of the second continuance control with reference to the flowchart shown in FIG. 7.

In the following description, S401, S402, . . . are identification signs representing a plurality of steps of the second continuance control. In the second continuance control, first, the process of step S401 is executed.

<Step S401>

In step S401, the conveyance control portion 8b determines whether or not the number of second conveyance processing has reached a predetermined upper-limit number. The upper-limit number is the maximum number of document sheets 9 that can be stacked on the second discharge tray 3c.

Upon determining that the number of second conveyance processing has reached the upper-limit number, the conveyance control portion 8b moves the process to step S402. Otherwise, the conveyance control portion 8b ends the second continuance control.

<Step S402>

In step S402, the conveyance control portion 8b determines whether or not the supply document sheet detection portion 5 has detected the first size document sheet. Upon determining that the supply document sheet detection portion 5 has detected the first size document sheet, the conveyance control portion 8b moves the process to step S403. Otherwise, the conveyance control portion 8b moves the process to step S405.

<Step S403>

In step S403, as in step S107 of FIG. 4, the main processing portion 8a outputs the conveyance change information via the display device 802. Thereafter, the main processing portion 8a moves the process to step S404. The main processing portion 8a executing the process of step S404 is an example of the first notification portion, too.

<Step S404>

In step S404, the conveyance control portion 8b changes the target conveyance process from the second conveyance process to the first conveyance process. Thereafter, the conveyance control portion 8b ends the second continuance control.

During the process of step S404, an image is read from a remaining first size document sheet, and the first size document sheet is conveyed to the first discharge tray 3b by the first conveyance process.

<Step S405>

In step S405, the main processing portion 8a outputs, via the display device 802, document sheet removal information that urges removing the document sheets 9 from the second discharge tray 3c. Thereafter, the main processing portion 8a moves the process to step S406.

<Step S406>

In step S406, the main processing portion 8a determines whether or not a predetermined confirmation operation was performed on the operation device 801. The confirmation operation is performed to confirm that the document sheets 9 have been removed from the second discharge tray 3c.

Upon determining that the confirmation operation was performed on the operation device 801, the main processing portion 8a ends the second continuance control. Otherwise, the main processing portion 8a moves the process to step S405.

It is noted that the main processing portion 8a stops outputting the document sheet removal information when the main processing portion 8a determines in step S406 that the confirmation operation was performed.

During the processes of step S405 and step S406, the document sheets 9 are removed from the second discharge tray 3c, and then the second conveyance process and the image reading process are continuously executed on the remaining document sheets 9.

As described above, the processes of steps S107 to S108 of FIG. 4 and step S201 of FIG. 5, or the processes of steps S302 to S303 of FIG. 6 and step S201 of FIG. 5, are executed when the following specific situation occurs after the start event occurs.

The specific situation is a situation in which the first conveyance process has been selected as the specified conveyance process, the tray closure sensor 52 has not detected the tray closure state, and the supply document sheet detection portion 5 has detected the second size document sheet.

In step S107 or step S302, the main processing portion 8a outputs, via the display device 802, the conveyance change information that indicates that the second conveyance process is executed.

Furthermore, after step S107 or step S302, the conveyance control portion 8b causes the conveyance device 4 to execute the second conveyance process in step S108 and step S201 or in step S303 and step S201.

That is, during the conveyance pre-process, the conveyance control portion 8b selects an appropriate conveyance process based on the content of the specified conveyance process and the detection result of the supply document sheet detection portion 5. This prevents the document sheet 9 from being conveyed along a conveyance path that does not match the size of the document sheet 9 in such a case where the conveyance path is selected by a user operation. Such a control is effective when the length of the document sheet 9 cannot be detected by a sensor disposed at the conveyance path 40 before the document sheet 9 reaches a branch point at which the conveyance path branches into two conveyance paths.

In addition, after the start even occurs, the processes of steps S104 to S105 are executed when the predetermined cursor matching condition is not satisfied between a detection result of the supply document sheet detection portion 5 and a detection result of the cursor position sensor 53.

In steps S104 to S105, the main processing portion 8a outputs the cursor adjustment information via the display device 802, and at least when the cursor matching condition is satisfied, stops outputting the cursor adjustment information.

In addition, when the cursor adjustment information is output, the conveyance control portion 8b prohibits the conveyance device 4 from operating until the predetermined release condition is satisfied (see steps S104 to S105).

That is, when there is a high possibility that the pair of side cursors 30 are located at an inappropriate position, the conveyance control portion 8b prohibits the conveyance device 4 from operating until the release condition is satisfied. This prevents the document sheet 9 from being fed to the conveyance path 40 in a skewed manner.

In addition, after the start even occurs, the main processing portion 8a executes the process of step S110 when the tray closure sensor 52 has detected the tray closure state, and the supply document sheet detection portion 5 has detected the second size document sheet (see steps S106 to S110 of FIG. 4).

Furthermore, the conveyance control portion 8b causes the conveyance device 4 to execute the second conveyance process only after the tray closure sensor 52 does not detect the tray closure state any more after the tray opening information is output in step S110 (see steps S109 to S110 of FIG. 4 and step S201 of FIG. 5).

Accordingly, it is prevented that the second conveyance process is executed while the second discharge tray 3c is closed.

In addition, after the start event occurs, the conveyance control portion 8b causes the conveyance device 4 to execute the second conveyance process when the second conveyance process has been selected as the specified conveyance process, and the supply document sheet detection portion 5 has detected the first size document sheet (see step S106 of FIG. 4 and step S201 of FIG. 5).

Subsequently, the conveyance control portion 8b causes the conveyance device 4 to execute the first conveyance process when the number of document sheets 9 conveyed during the second conveyance process has reached the predetermined upper-limit number (see steps S401 to S404 of FIG. 7 and step S201 of FIG. 5).

With the above-described configuration, it is possible to prevent an excessive stack of the document sheets 9 on the second discharge tray 3c in such a case where the conveyance path of the document sheet 9 is selected by a user operation.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
   a first tray, a second tray, and a third tray respectively configured such that document sheets are stacked thereon;
   a document sheet length detection portion configured to detect the document sheets placed on the first tray while distinguishing between a first size document sheet and a second size document sheet, the first size document sheet being a document sheet whose length in a conveyance direction is equal to or longer than a predetermined reference length, the second size document sheet being a document sheet whose length in the conveyance direction is shorter than the reference length;

a conveyance device configured to selectively execute a first conveyance process and a second conveyance process, wherein in the first conveyance process, the conveyance device conveys the document sheets on the first tray one by one along a first conveyance path that corresponds to conveyance of the second size document sheet, and discharges the second size document sheet onto the second tray, and in the second conveyance process, the conveyance device conveys the document sheets on the first tray one by one along a second conveyance path that corresponds to conveyance of the first size document sheet and the second size document sheet, and discharges the document sheets onto the third tray;

an image reading portion configured to read an image from a document sheet conveyed during the first conveyance process or the second conveyance process;

a selection portion configured to select, as a specified conveyance process, one of the first conveyance process and the second conveyance process in accordance with a predetermined selection operation; and a control portion configured to, after a predetermined start event occurs, cause the conveyance device to execute the second conveyance process when the second conveyance process has been selected as the specified conveyance process and the document sheet length detection portion has detected the first size document sheet, and cause the conveyance device to execute the first conveyance process when a number of document sheets conveyed during the second conveyance process has reached a predetermined upper-limit number.

2. The image reading device according to claim 1, wherein
the third tray is supported in such a way as to be displaced between a closing position and an opening position, wherein at the closing position, the third tray closes a discharge port of the second conveyance path, and at the opening position, the third tray opens the discharge port of the second conveyance path.

3. The image reading device according to claim 2, further comprising:
a tray closure detection portion configured to detect a tray closure state in which the third tray is located at the closing position; and a first notification portion configured to output, via an information output device, tray opening information when, after the start event occurred, the tray closure detection portion has detected the tray closure state, and the document sheet length detection portion has detected the second size document sheet, the tray opening information urging opening of the third tray, wherein
the control portion causes the conveyance device to execute the second conveyance process only after the tray closure detection portion does not detect the tray closure state any more after the tray opening information is output.

4. The image reading device according to claim 3, wherein
the first notification portion outputs, via the information output device, conveyance change information and the control portion causes the conveyance device to execute the second conveyance process when, after the start event occurred, the first conveyance process has been selected as the specified conveyance process, the tray closure detection portion has not detected the tray closure state, and the document sheet length detection portion has detected the second size document sheet, the conveyance change information indicating that the second conveyance process is executed.

5. The image reading device according to claim 1, further comprising:
a pair of side cursors that are provided at the first tray in such a way as to move along a width direction crossing the conveyance direction, and are placed along opposite sides of the document sheets on the first tray;

a cursor position detection portion configured to detect a position of the pair of side cursors in the width direction; and a second notification portion configured to output, via an information output device, cursor adjustment information when, after the start event occurs, a predetermined cursor matching condition is not satisfied between a detection result of the document sheet length detection portion and a detection result of the cursor position detection portion, and stop outputting the cursor adjustment information when the cursor matching condition is satisfied, the cursor adjustment information urging position adjustment of the pair of side cursors, wherein
when the cursor adjustment information is output, the control portion prohibits the conveyance device from operating until a predetermined release condition is satisfied.

* * * * *